United States Patent
Ramani et al.

(10) Patent No.: US 8,683,179 B2
(45) Date of Patent: Mar. 25, 2014

(54) METHOD AND APPARATUS FOR PERFORMING STORE-TO-LOAD FORWARDING FROM AN INTERLOCKING STORE USING AN ENHANCED LOAD/STORE UNIT IN A PROCESSOR

(75) Inventors: Krishnan Ramani, Cupertino, CA (US); Chitresh C. Narasimhaiah, San Jose, CA (US); David Hugh McIntyre, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 547 days.

(21) Appl. No.: 12/956,299

(22) Filed: Nov. 30, 2010

(65) Prior Publication Data

US 2012/0137109 A1    May 31, 2012

(51) Int. Cl.
 G06F 9/30 (2006.01)
 G06F 9/40 (2006.01)
 G06F 15/00 (2006.01)

(52) U.S. Cl.
 USPC ......................................................... 712/216

(58) Field of Classification Search
 None
 See application file for complete search history.

(56) References Cited

PUBLICATIONS

Stone et al.; Address-Indexed Memory Disambiguation and Store-to-Load Forwarding; 2005; IEEE.*

* cited by examiner

Primary Examiner — Corey S Faherty
(74) Attorney, Agent, or Firm — Volpe and Koenig, P.C.

(57) ABSTRACT

A method and a processor load/store unit (LSU) are described for performing store-to-load forwarding (STLF) from an interlocking store. STLF is performed when a starting address of the store and the load do not match, or when a data size of the store is smaller than a data size of the load. The LSU detects a load that interlocks with a store, and determines whether all or only a portion of data bytes needed by the load can be provided by the interlocking store. If it is determined that only a portion of the data bytes needed by the load can be provided by the interlocking store, then that portion of the data bytes is provided by a store data buffer (SDB) and the remaining portion of the data bytes needed by the load is provided by a data cache (DC). Otherwise, the SDB provides all of the data bytes.

9 Claims, 5 Drawing Sheets

METHOD AND APPARATUS FOR PERFORMING STORE-TO-LOAD FORWARDING FROM AN INTERLOCKING STORE USING AN ENHANCED LOAD/STORE UNIT IN A PROCESSOR

FIELD OF INVENTION

This application is related to a high performance processor.

BACKGROUND

Modern high performance processors execute loads and stores out of order. To avoid an error, a load needs to read the data written by an older store to the same address in memory. For example, if a load attempts to execute from a particular address, but there is a pending older store that is waiting to be written to the same particular address, then the execution of the load will be stalled until the older store is written to memory. However, to enhance performance, a conventional load store unit (LSU) in the processor forwards the data from the store to the load, without waiting for the store data to be written to memory.

Figure 1:
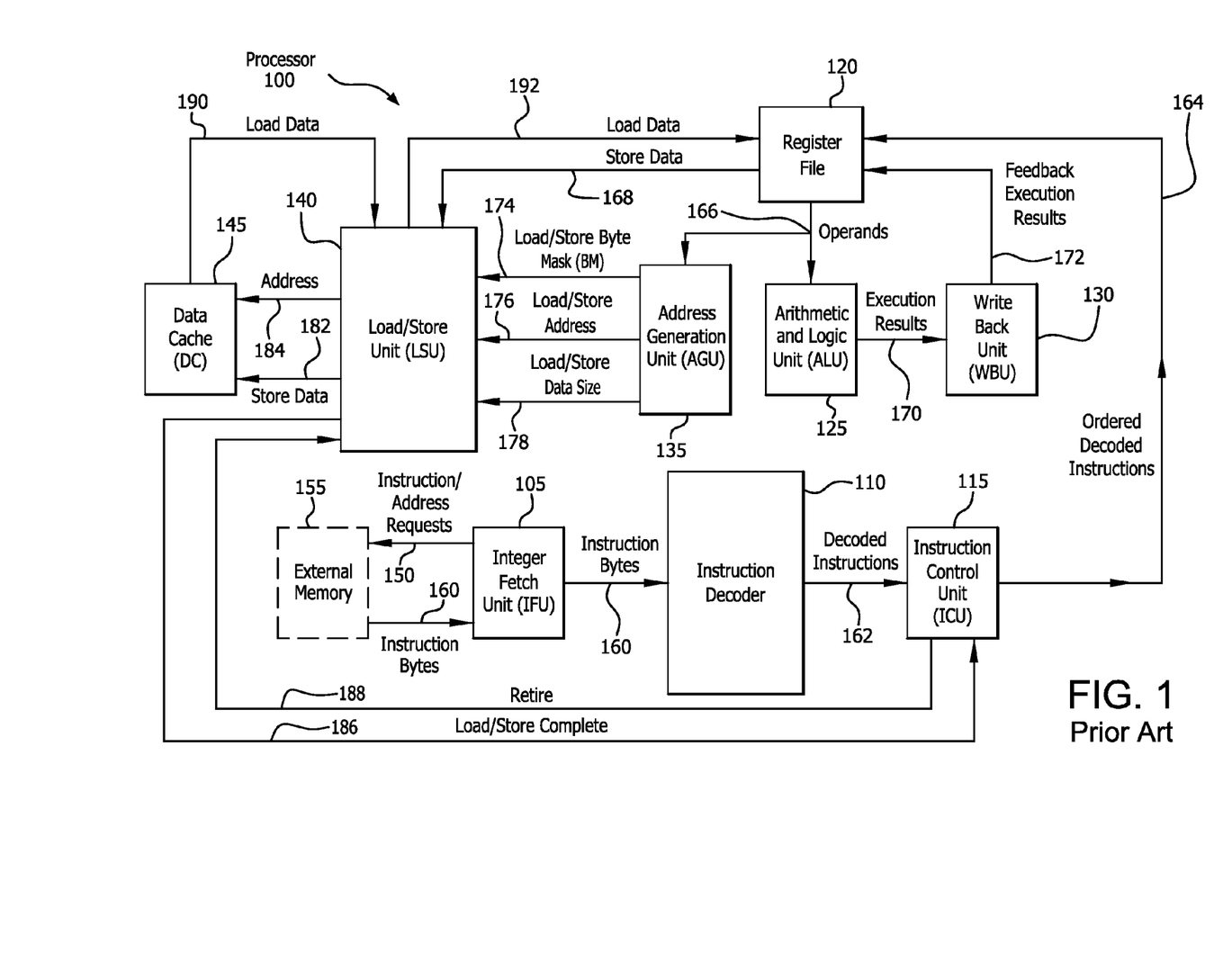
FIG. 1 shows a conventional out-of-order executing processor.

FIG. 1 shows a conventional out-of-order executing processor 100. The processor 100 may be one of many processor cores that are combined on a single semiconductor chip. The processor 100 includes an integer fetch unit (IFU) 105, an instruction decoder 110, an instruction control unit (ICU) 115, a register file 120, an arithmetic and logic unit (ALU) 125, a write back unit (WBU) 130, an address generation unit (AGU) 135, a load/store unit (LSU) 140, and a data cache (DC) 145.

Still referring to FIG. 1, as an ongoing process, the IFU 105 sends instruction/address requests 150 that request an external memory 155 to send instruction bytes 160 from particular addresses. The IFU 105 outputs the instruction bytes 160 to the instruction decoder 110, which decodes the instruction bytes 160 such that each instruction is uniquely identified by a certain combination of bits. The instruction decoder 110 has the knowledge to interpret these instructions. For example, the instruction decoder 110 may determine whether an instruction is performing an "add" or a "multiply" function.

The instruction decoder 110 feeds to the ICU 115 a series of decoded instructions 162 that are to be executed in a particular order. The ICU 115 orchestrates (i.e., schedules) the execution of the decoded instructions 162. The decoded instructions 162 may be executed out of order to enhance performance. The ICU 115 maintains an in-order table of all of the decoded instructions 162 that the ICU 115 receives from the instruction decoder 110 until particular ones of the decoded instructions 162 are retired.

The ICU 115 outputs ordered decoded instructions 164 to the register file 120. The register file 120 provides operands 166 for executing the ordered decoded instructions 164 to the ALU 125 and the AGU 135, and provides store data 168 to the LSU 140. The ALU 125 executes simple instructions which do not involve memory, (i.e., instructions which are purely arithmetical or purely logical and do not involve memory), and outputs execution results 170 to the WBU 130.

The WBU 130 receives the execution results 170 and outputs feedback execution results 172 to the register file 120, after determining which addresses in the register file 120 to store the feedback execution results 172. The AGU 135 computes the address for loads and stores, and outputs a load/store byte mask (BM) signal 174, a load/store address signal 176 and a load/store data size signal 178 to the LSU 140.

There are two different categories of instructions which are executed by the processor 100: 1) arithmetic and logic instruction; and 2) load/store instructions.

Arithmetic and logic instructions, such as "ADD", "SUB" and "AND", are executed by the ALU 125. These instructions read their operands 166 from the register file 120 and write their results back to the register file 120. These results become input operands to subsequent instructions. These instructions typically have a fixed latency, and the number of clock cycles to execute them are known in advance.

Load/store instructions, which involve reading from memory (loads) and writing to memory (stores), are executed by the LSU 140. The AGU 135 generates the address for a load instruction from which the data is read, and the address of a store instruction to which the data is written. Load/store instructions typically have a variable latency.

The LSU 140 outputs stored data 182 to the DC 145 to write data, and outputs an address 184 to the DC 145 to read data. Furthermore, the LSU 140 signals completion of the execution of instructions by sending a load/store complete signal 186 to the ICU 115. The ICU 115 will eventually "retire" these instructions by sending a retire signal 188 to the LSU 140, once they have finished execution, in order to give an appearance of in-order execution. From a programmer's point of view, instructions are considered executed once they have been retired. The DC 145 outputs load data 190 to the LSU 140, which then outputs load data 192 to the register file 120.

Figure 2:
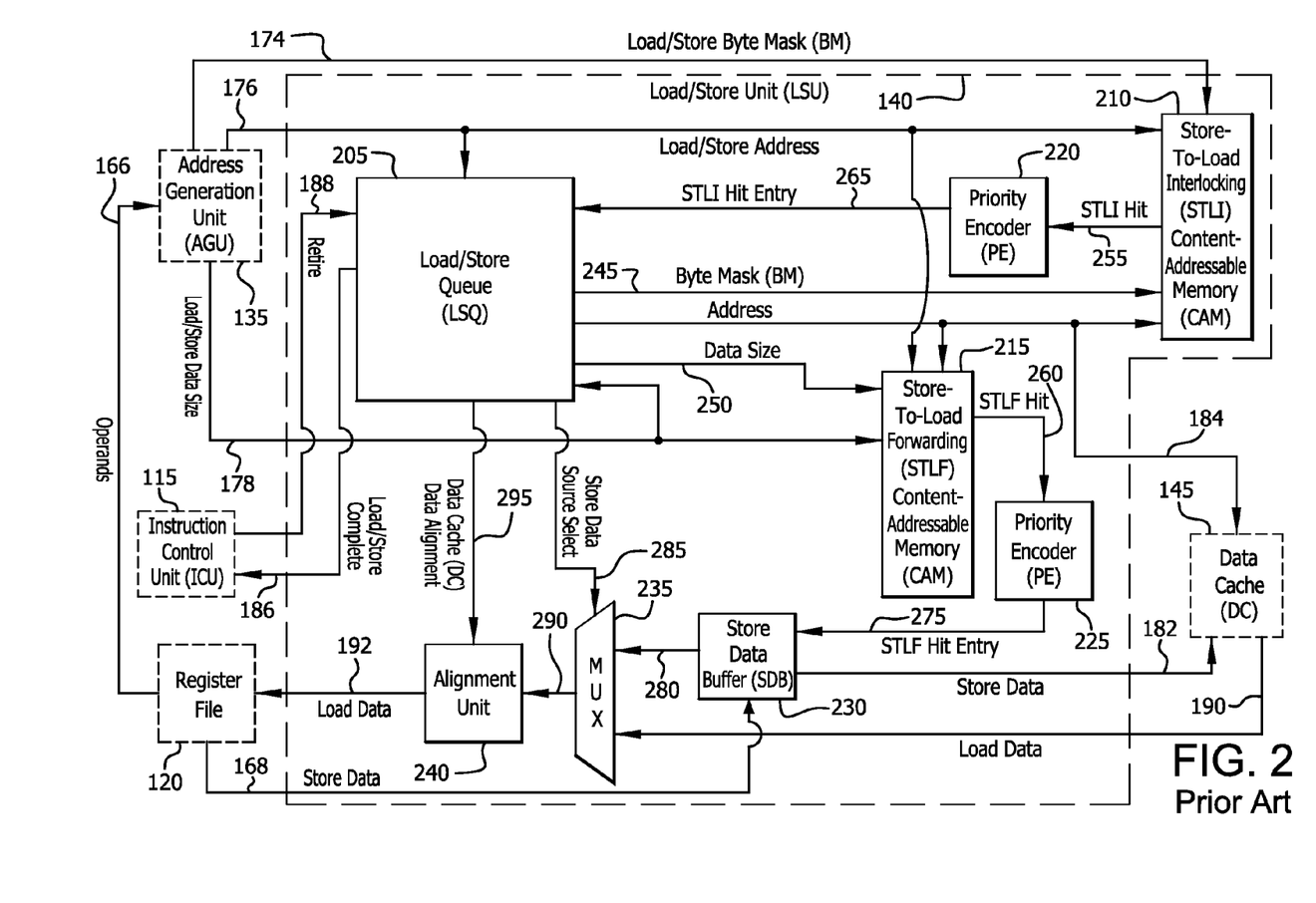
FIG. 2 shows details of a load store unit (LSU) inside the conventional out-of-order executing processor of FIG. 1.

FIG. 2 shows the details of the LSU 140 in the conventional processor 100 of FIG. 1. As shown in FIG. 2, the LSU 140 includes a load/store queue (LSQ) 205, a store-to-load interlocking (STLI) content-addressable memory (CAM) 210, a store-to-load forwarding (STLF) CAM 215, a first priority encoder (PE) 220, a second PE 225, a store data buffer (SDB) 230, a multiplexer (MUX) 235 and an alignment unit 240. Loads and stores are executed by allowing them to flow within an LSU pipeline, which is provided by the LSU 140. At the end of the flow, loads successfully complete if they can return valid data (i.e., load data 192) to the register file 120. If a load fails to complete, the load may be returned to the beginning of the flow, (i.e., as operands 166 input into the AGU 135), one or more times until the load successfully returns valid data.

Typically, a store instruction, (i.e., a store), takes the result of a prior computation, saved in the register file 120, and writes it to the DC 145. Stores are executed in two phases: a pre-retire phase and a post-retire phase. In the pre-retire phase, the address of a particular store is computed out of order by the AGU 135 and sent to the LSQ 205, the STLI CAM 210 and the STLF CAM 215 via the load/store address signal 176.

The store instruction that is the oldest memory instruction in the LSQ 205 is executed when the LSQ 205 receives a store address, (the memory location to which the store data 168 needs to be written), via the load/store address signal 176 and a store data size via the load/store data size signal 178. The store address is recorded in the LSQ 205, the STLI CAM 210 and the STLF CAM 215. The store data size is recorded in the LSQ 205 and the STLF CAM 215. The LSQ 205 outputs an address 184 and a BM 245, which are recorded in the STLI CAM 210. The address 184 is also recorded in the STLF CAM 215. The store data 168 is also independently read from the register file 120 when it is ready and is written in the SDB 230.

When all older loads and stores have sent load/store complete signals 186 to the ICU 115, the marked store completes the pre-retire phase of execution and sends its store complete signal 186 to the ICU 115. Upon receiving a load/store complete signal 186, the ICU 115 will retire the store, after all of the older load/store instructions have retired. The ICU 115 will send a retire signal 188 to the LSQ 205 for the currently retired store.

When the LSQ 205 receives the retire signal 188, the marked store enters the post-retire phase from the pre-retire phase. In this phase, the oldest store reads the SDB 230, writes the store data 182 to the DC 145, and is then removed from the LSQ 205. This completes the execution of the post-retire phase and is also referred to as committing the store.

Typically, a load instruction, (i.e., a load), reads data from the DC 145 and writes data to the register file 120. However, if there is at least one older store to the same address as the load in the LSQ 205, the load is required to read the store data from the SDB 230, rather than from the DC 145, since the SDB 230 contains the latest data about to be written. Such stores are also referred to as overlapping stores, if there is one or more bytes that the older store is writing to, and which the load needs to read in order to correctly execute. These stores may be partially overlapping if it is only writing part of the bytes which the load needs.

When the load receives its address 176 from the AGU 135, it is recorded in the LSQ 205 along with the data size 178. When the execution of the load is scheduled by the LSQ 205, it compares all entries in the STLF CAM 215 with its address 184 and data size 250 to see if there are any prior older stores to the same address as that of the load. The STLF CAM 215 includes a table with two fields: a first field indicating a starting word address of the store; and a second field indicating the data size of the store. The load may have one or more matches with an older uncommitted store, (stores not yet written to the DC 145), to the same address as that of the load and whose size is at least as large as the load. An indication of each of these matches is included in an STLF hit signal 260 that is output by the STLF CAM 215 to the PE 225. The PE 225 computes the youngest of the older matching uncommitted stores and outputs an STLF hit entry signal 275 to the SDB 230 to select a store entry that will provide the data for the load. The STB 230 outputs data 280 to a first input of the MUX 235. The DC 145 outputs load data 190 to a second input of the MUX 235. On a hit in the STLF CAM 215, the MUX 235 is controlled by a store data source select signal 285 output by the LSQ 205 to allow the data 280 to become the load data, instead of the load data 190. The output 290 of the MUX 235 is a word having multiple bytes. The alignment unit 240 is controlled by DC data alignment signal 295 to shift the bytes in the output 290 based on which byte is to be read.

However, it is quite possible that not all bytes needed to be read by the load are being written by store, resulting in a partial overlap between the load and the store. When there is a partial overlap between the bytes written by the store and the bytes read by the load, the store and the load do not have an exact match in their starting address, and/or the store size is smaller than the load size. Thus, the STLF CAM 215 will not generate the STLF hit signal 260 and the load will not be able to successfully forward from the store, resulting in a failed execution of the load.

In some cases, all the bytes needed by the load may be supplied by an older store. However, the starting address between the load and the store may not match. In this case also, the STLF CAM 215 will not generate an STLF hit signal 260, resulting in a failed execution of the load.

The STLI CAM 210, similar to the STLF CAM 215, includes a table with two fields: a first field indicating the starting word aligned address of the store; and a second field indicating each of the bytes within the starting word aligned address. Along with the lookup of the STLF CAM 215, the STLI CAM 210 is looked up by the load, and all of its entries that are older than the load are compared. If there is a word aligned address match and at least one byte match between the load and any older store entry, then the entries overlap. An STLI hit signal 255 indicating an overlap between all older stores and the load is output to the PE 220, which identifies the youngest of the older stores. The PE 220 outputs an STLI hit entry signal 265 which, if it is not the same as the STLF hit entry 275, indicates that the load cannot forward from the store because there is only a partial overlap and/or the starting address of the load and the store is not the same. The load marks this store, from which it is unable to forward as an interlocking store. The load will be unable to complete execution successfully and will be stalled, until the marked interlocking store identified by the STLI hit entry signal 265 commits (is written into the DC 145).

The conventional STLF scheme described above enables uncommitted store data to be forwarded to a load, as long as the store starting address matches that of the load, and the store size is greater than or equal to that of the load. Any other overlapping store, from which a load is unable to forward, results in the load interlocking with the store and causing it to stall execution until the store commits, potentially resulting in a degradation in performance.

The STLF logic is one of the critical paths in the processor 100, and hence may limit the maximum frequency to which the processor 100 may be scaled. As a consequence, it is necessary to keep the logic simple, so that it does not inhibit frequency scaling.

SUMMARY OF EMBODIMENTS

A method and a processor load/store unit (LSU) are described for performing store-to-load forwarding (STLF) from an interlocking store. STLF is performed when a starting address of the store and the load do not match, or when a data size of the store is smaller than a data size of the load. The LSU detects a load that interlocks with a store, and determines whether all or only a portion of data bytes needed by the load can be provided by the interlocking store. If it is determined that only a portion of the data bytes needed by the load can be provided by the interlocking store, then that portion of the data bytes is provided from a store data buffer (SDB) and the remaining portion of the data bytes needed by the load is provided from a data cache (DC). Otherwise, the SDB provides all of the data bytes.

In another embodiment of the present invention, a processor comprising a DC and an LSU is configured to perform STLF from an interlocking store by detecting a load that interlocks with a store, and determining whether all or only a portion of data bytes needed by the load can be provided by the interlocking store.

In yet another embodiment of the present invention, a method of operating an LSU for performing store-to-load forwarding (STLF) from an interlocking store comprises providing the portion of data bytes from a store data buffer (SDB) in response to only being able to provide a portion of data bytes needed by a load due to the load interlocking with a store.

In yet another embodiment of the present invention, a computer-readable storage medium is configured to store a set of instructions used for fabricating a semiconductor device that comprises a DC and an LSU configured to perform STLF from an interlocking store by detecting a load that interlocks with a store, and determine whether all or only a portion of data bytes needed by the load can be provided by the interlocking store. The LSU may comprise a store data buffer (SDB), and if the LSU determines that only a portion of the data bytes needed by the load can be provided by the interlocking store, the portion of the data bytes is provided by the SDB and the remaining data bytes needed by the load are provided by the DC. The instructions may be Verilog data instructions or hardware description language instructions. The semiconductor device may be a processor.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

The conventional STLF scheme described above enables uncommitted store data to forward to a load, as long as the store starting address matches that of the load and the store size is greater than or equal to that of the load. The STLF logic is one of the critical paths in a processor, and hence may limit the maximum frequency to which a processor may be scaled. As a consequence, it is necessary to keep the logic simple, so that it does not inhibit frequency scaling.

The present invention enhances the performance of the STLF mechanism of a conventional processor by allowing interlocking stores to forward to loads without significantly compromising the performance of the processor. As described hereinafter, the processor may be a central processing unit (CPU), a graphics processing unit (GPU) or any other type of processor. The present invention improves the performance of the conventional processor by its ability to perform STLF from interlocking stores, instead of stalling the execution of the load until the interlocking store commits.

Figure 3:
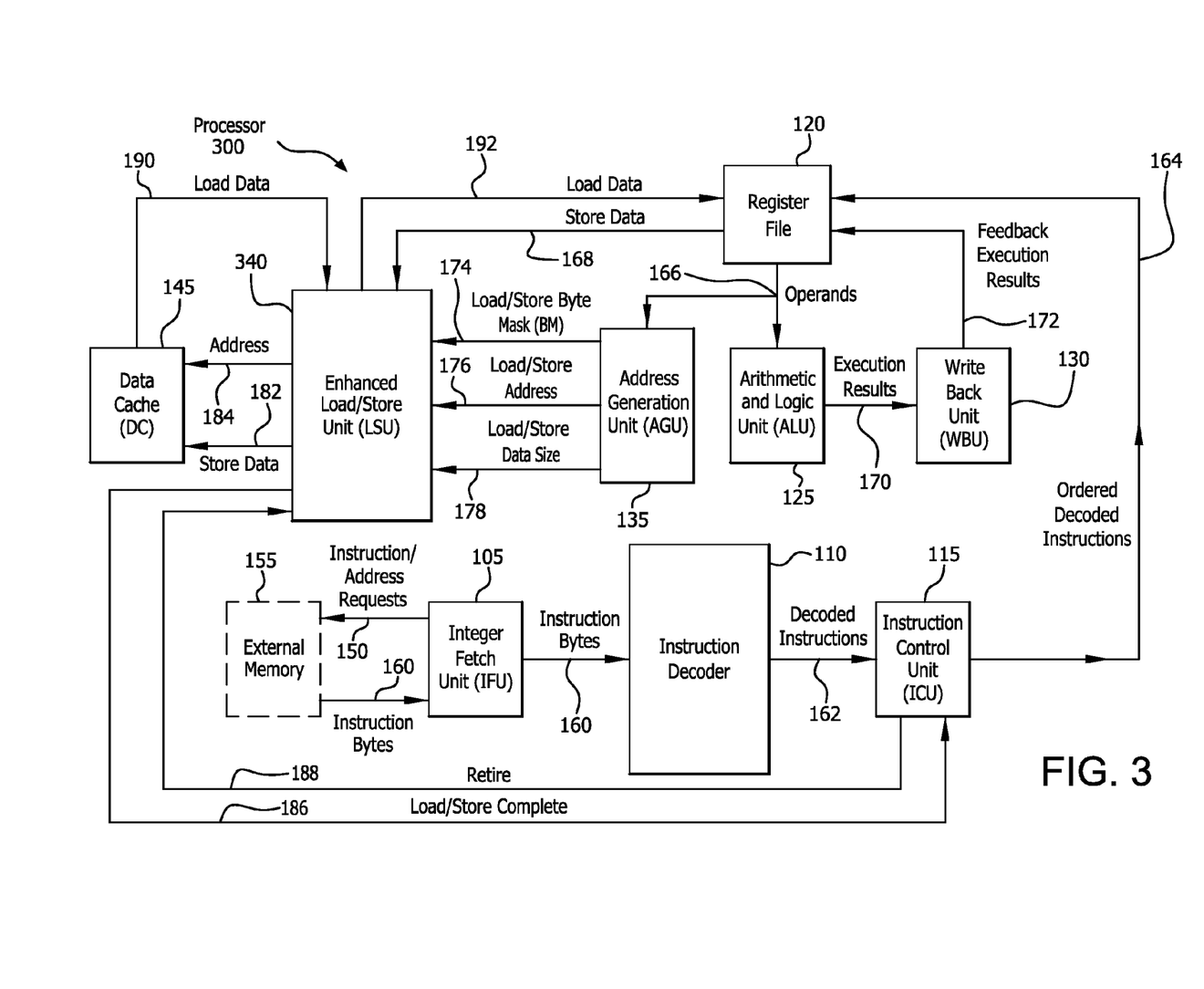
FIG. 3 shows an out-of-order executing processor including an enhanced LSU in accordance with the present invention.

FIG. 3 shows an out-of-order executing processor 300 configured in accordance with the present invention. The processor 300 may be one of many processor cores that are combined on a single semiconductor chip. The processor 300 includes an IFU 105, an instruction decoder 110, an ICU 115, a register file 120, an ALU 125, a WBU 130, an AGU 135, an enhanced LSU 340 and a DC 145.

Still referring to FIG. 3, the IFU 105 sends instruction/address requests 150 that request an external memory 155 to send instruction bytes 160 from particular addresses. The IFU 105 outputs the instruction bytes 160 to the instruction decoder 110, which decodes the instruction bytes 160 such that each instruction is uniquely identified by a certain combination of bits. The instruction decoder 110 has the information necessary to interpret these instructions. For example, the instruction decoder 110 may determine whether an instruction is performing an "add" or a "multiply" function.

The instruction decoder 110 feeds to the ICU 115 a series of decoded instructions 162 that are to be executed in a particular order. The ICU 115 orchestrates (i.e., schedules) the execution of the decoded instructions 162. The decoded instructions 162 may be executed out of order to enhance performance. The ICU 115 maintains an in-order table of all of the decoded instructions 162 that the ICU 115 receives from the instruction decoder 110 until particular ones of the decoded instructions 162 are retired.

The ICU 115 outputs ordered decoded instructions 164 to the register file 120. The register file 120 provides operands 166 for executing the ordered decoded instructions 164 to the ALU 125 and the AGU 135, and provides store data 168 to the enhanced LSU 340. The ALU 125 executes simple instructions which do not involve memory, (i.e., instructions which are purely arithmetical or purely logical and do not involve memory), and outputs execution results 170 to the WBU 130.

The WBU 130 receives the execution results 170 and outputs feedback execution results 172 to the register file 120, after determining which addresses in the register file 120 to store the feedback execution results 172. The AGU 135 computes the address for loads and stores, and provides a load/store byte mask (BM) signal 174, a load/store address signal 176 and a load/store data size signal 178 to the enhanced LSU 340.

There are two different categories of instructions which are executed by the processor 300: 1) arithmetic and logic instructions; and 2) load/store instructions.

Arithmetic and logic instructions, such as "ADD", "SUB" and "AND", are executed by the ALU 125. These instructions read their operands 166 from the register file 120 and write their results back to the register file 120. These results become input operands to subsequent instructions. These instructions typically have a fixed latency, and the number of clock cycles to execute them are known in advance.

Load/store instructions, which involve reading from memory (loads) and writing to memory (stores), are executed by the enhanced LSU 340. The AGU 135 generates the address for a load instruction from which the data is read, and the address of a store instruction to which the data is written. Load/store instructions typically have a variable latency.

The enhanced LSU 340 outputs stored data 182 to the DC 145 to write data, and outputs an address 184 to the DC 145 to read data. Furthermore, the enhanced LSU 340 signals completion of the execution of instructions by sending a load/store complete signal 186 to the ICU 115. The ICU 115 will eventually "retire" these instructions by sending a retire signal 188 to the enhanced LSU 340, once they have finished execution, in order to give an appearance of in-order execution. From a programmer's point of view, instructions are considered executed once they have been retired. The DC 145 outputs load data 190 to the enhanced LSU 340, which then outputs load data 192 to the register file 120.

Figure 4:
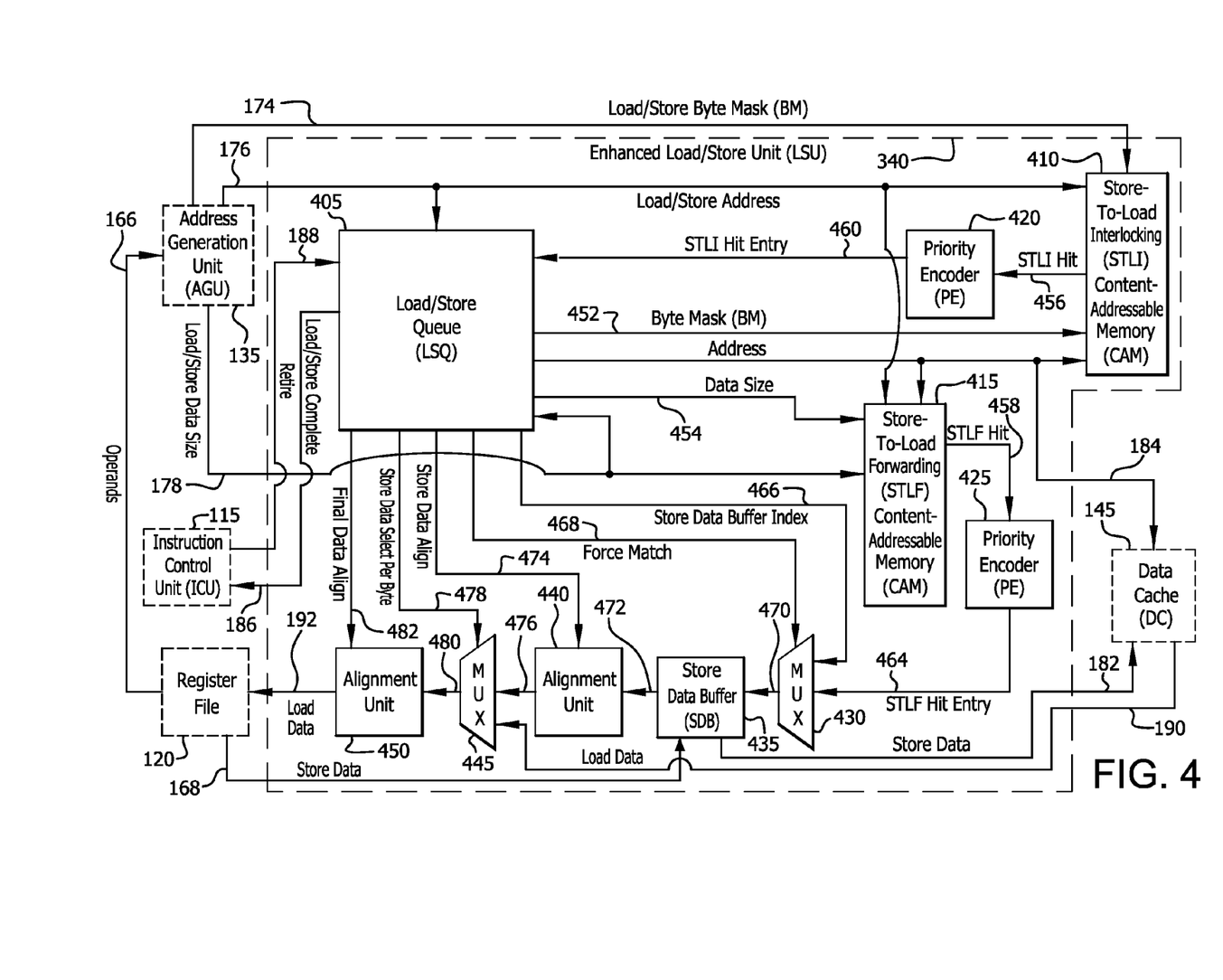
FIG. 4 shows details of the enhanced LSU inside the processor of FIG. 3.

FIG. 4 shows the details of the enhanced LSU 340 in the processor 300 of FIG. 3. As shown in FIG. 4, the enhanced LSU 340 includes an LSQ 405, an STLI CAM 410, an STLF CAM 415, a first PE 420, a second PE 425, a first MUX 430, an STB 435, a first alignment unit 440, a second MUX 445 and a second alignment unit 450. Loads and stores are executed by allowing them to flow within an LSU pipeline, which is provided by the enhanced LSU 340. At the end of the flow, loads successfully complete if they can return valid data (i.e., load data 192) to the register file 120. If a load fails to complete, the load may be returned to the beginning of the flow, (i.e., as operands 166 input into the AGU 135), one or more times until the load successfully returns valid data.

Typically, a store instruction, (i.e., a store), takes the result of a prior computation, saved in the register file 120, and writes it to the DC 145. Stores are executed in two phases: a pre-retire phase and a post-retire phase. In the pre-retire phase, the address of a particular store is computed out of order by the AGU 135 and sent to the LSQ 405, the STLI CAM 410 and the STLF CAM 415 via the load/store address signal 176.

The store instruction that is the oldest memory instruction in the LSQ 205 is executed when the LSQ 405 receives a store address, (the memory location to which the store data 168 needs to be written), via the load/store address signal 176 and a store data size via the load/store data size signal 178. The store address is recorded in the LSQ 405, the STLI CAM 410 and the STLF CAM 415. The store data size is recorded in the LSQ 405 and the STLF CAM 415. The LSQ 405 outputs an address 184 and a BM 452, which are recorded in the STLI CAM 410. The address 184 is also recorded in the STLF CAM 415. The store data 168 is also independently read from the register file 120 when it is ready and is written in the SDB 435.

When all older loads and stores have sent load/store complete signals 186 to the ICU 115, the marked store completes the pre-retire phase of execution and sends its store complete signal 186 to the ICU 115. Upon receiving a load/store complete signal 186, the ICU 115 will retire the store, after all of the older load/store instructions have retired. The ICU 115 will send a retire signal 188 to the LSQ 405 for the currently retired store.

Typically, a load instruction, (i.e., a load), reads data from the DC 145 and writes data to the register file 120. However, if there is at least one older store to the same address as the load in the LSQ 405, the load is required to read the store data from the SDB 435, rather than from the DC 145, since the SDB 435 contains the latest data about to be written.

When the load receives its address 176 from the AGU 135, it is recorded in the LSQ 405 along with the data size 178 and the BM 174 of the load operation. When the execution of the load is scheduled by the LSQ 405, it compares all entries in the STLF CAM 415 with its address and size 454 to see if there are any prior older stores to the same address as that of the load. The STLF CAM 415 includes a table with two fields: a first field indicating a starting word address of the store; and a second field indicating the data size of the store. The load may have one or more matches with an older uncommitted store, (stores not yet written to the DC 145), to the same address as that of the load whose size is at least as large as the load. An indication of each of these matches is included in an STLF hit signal 458 that is output by the STLF CAM 415 to the PE 425.

When there is a partial overlap between the bytes written by the store and the bytes read by the load, the store and the load do not have an exact match in their starting address, and/or the store size is smaller than the load size. Thus, the STLF CAM 415 will not generate the STLF hit signal 458 and the load will not be able to successfully forward from the store, resulting in a failed execution of the load.

In some cases, all the bytes needed by the load may be supplied by an older store. However, the starting address between the load and the store may not match. In this case too, the STLF CAM 415 will not generate a hit signal, resulting in a failed execution of the load.

The STLI CAM 410, similar to the STLF CAM 415, includes a table with two fields: a first field indicating the starting word aligned address of the store, and a second field indicating each of the bytes within the starting word aligned address. Along with the lookup of the STLF CAM 415, the STLI CAM 410 is looked up by the load and at least one byte match between the load and any other store entry, then the entries overlap. An STLI hit signal 456 indicating an overlap between all older stores and the load is output to the PE 420, which identifies the youngest of the older stores. The PE 420 outputs an STLI hit entry signal 460 which, if it is not the same as the STLF hit entry signal 464, indicates that the load cannot forward from the store because there is only a partial overlap and/or the starting address of the load and the store is not the same. The load marks this store, from which it is unable to forward as an interlocking store. The load will be unable to complete execution successfully and will be stalled, until the marked interlocking store identified by the STLI hit entry signal 460 commits (is written into the DC 145).

The present invention addresses two different scenarios associated with interlocking stores and STLF. In a wide-to-narrow (WTN) forwarding scenario, the load interlocks with a store, whereby all of the bytes needed by the load may be fully provided by the interlocking store. In a narrow-to-wide (NTW) forwarding scenario, the load interlocks with a store, whereby only a portion of the bytes needed by the load may be fully provided by the interlocking store, and the remaining portion of the bytes is provided by the DC 145.

The PE 425 sends the STLF hit entry signal 464 to a first input of the first MUX 430. The LSQ 405 sends a store data buffer index signal 466 to a second input of the first MUX 430. A force match signal 468 output by the LSQ 405 causes the first MUX 430 to ignore the outcome of the STLF hit entry signal 464 and instead directly read the data pointed to by the store queue data index signal 466, which references the interlocking store. The force match signal 468 effectively causes signal 466 to be driven as signal 470 to select the interlocking store entry from the SDB 435.

For the NTW scenario, a store data align signal 474 output by the LSQ 405 is used to control the shift of store data 472 output by the SDB 435 to the correct byte position, relative to the load address 184, by the first alignment unit 440. The first alignment unit 440 outputs a signal 476 which carries the data from the interlocking store to the first input of the second MUX 445. The DC 145 outputs load data 190 to a second input of the second MUX 445. A store data select per byte signal 478 output by the LSQ 405 enables selecting of individual bytes for the load data from either the DC 145 or the SDB 435.

For the WTN scenario, all of the data bytes to service the load are supplied by the SDB 435. For the NTW scenario, each byte may come from either the DC 145 or the SDB 435. The second MUX 445 outputs a signal 480 to the second alignment unit 450. A final data align signal 482 output by the LSQ 405 controls the final shift of the data 480 to produce the load data 192, which is written into the register file 120.

The present invention is implemented when a load attempts to forward from a store and matches with an interlocking store. Upon detecting the interlocking store, the store entry, and the interlocking forwarding scenario, (i.e., WTN or NTW), the shift count for the alignment units 440 and 450, and the store data select per byte signal 478 for the MUX 445, which controls the source of the data from either the SDB 435 or the DC 145, are recorded in the enhanced LSQ 405 at the end of the load flow. Instead of the load now stalling until the interlocking store commits, the load is re-flowed again immediately. During this flow, the load asserts the force match signal 468, along with the store queue data index signal 466. This overrides the entry selected by the STLF CAM 415 and causes the previously recorded interlocking store entry to be read out of the SDB 435. The alignment unit 440 shifts the bytes of the SDB data 472 by the value indicated by the store data align signal 474.

For the WTN scenario, the store data select per byte signal 478 always selects all of the bytes originating from the SDB 435 on signal 476. For the NTW scenario, a portion of the bytes originate from the SDB 435 and the remaining bytes originate from the DC 145. Finally, the alignment unit 450 shifts the data based on the final data align signal 482 before it is written to the register file 120.

By supporting the ability of the processor 300 of FIG. 3 to perform STLF from an interlocking store, without adding complex logic to the critical path, the performance of the processor 300 is enhanced.

Figure 5:
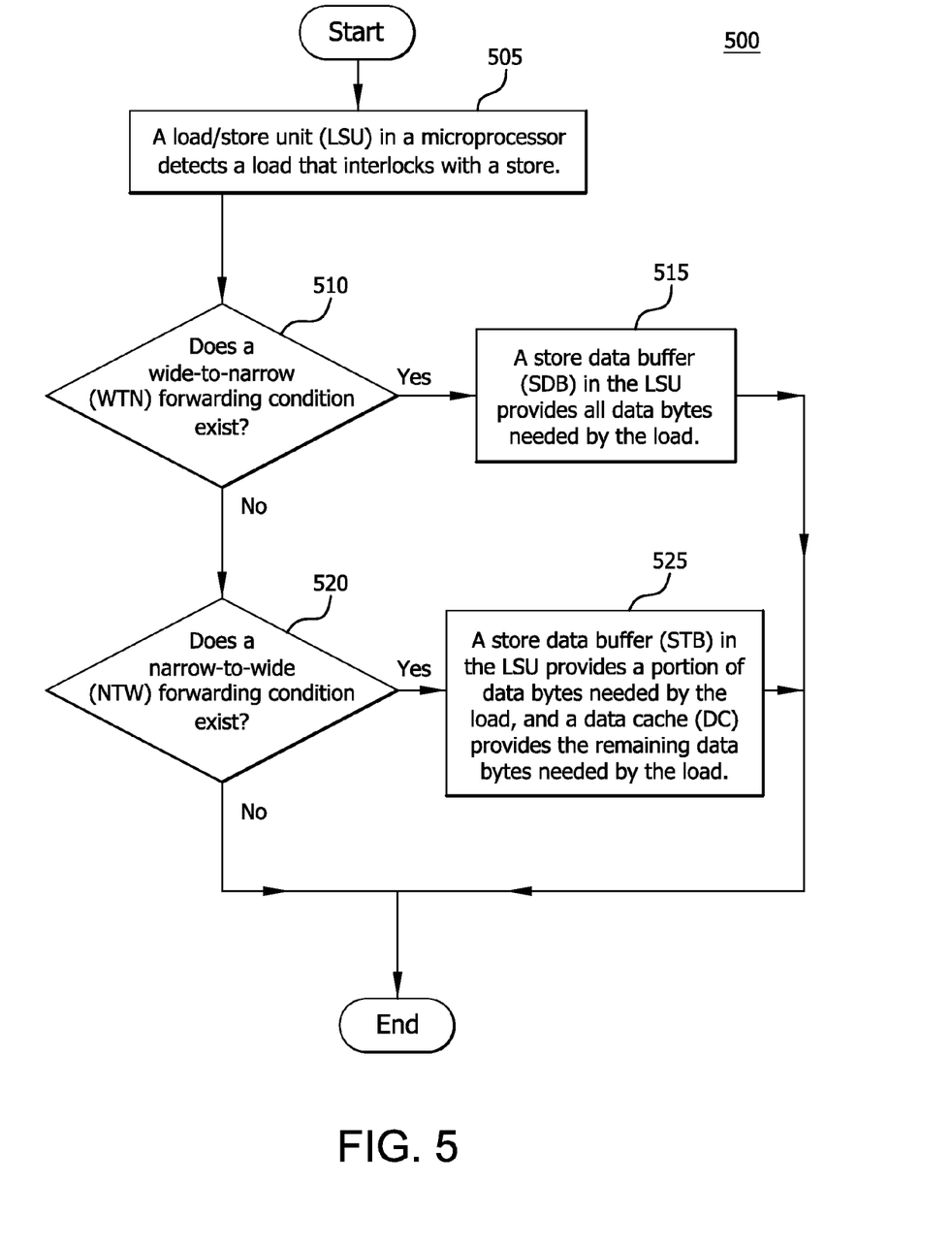
FIG. 5 is a flow diagram of a procedure for performing store-to-load forwarding (STLF) from an interlocking store using the enhanced LSU of FIG. 4.

FIG. 5 is a flow diagram of a procedure 500 for performing STLF from an interlocking store using the enhanced LSU 340 of FIG. 4. In step 505, the enhanced LSU 340 in the processor 300 detects a load that interlocks with a store. In step 510, a determination is made as to whether a WTN forwarding condition exists. If the determination made in step 510 is positive, the SDB 435 in the LSU 340 provides all data bytes needed by the load (515). If the determination made in step 510 is negative, a determination is made as to whether an NTW forwarding condition exists (520). If the determination made in step 520 is positive, the SDB 435 in the LSU 340 provides a portion of data bytes needed by the load, and the DC 145 provides the remaining data bytes needed by the load (525).

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

What is claimed is:

1. A method, performed using a processor, of store-to-load forwarding (STLF) from an interlocking store, the method comprising:
    a load/store unit (LSU) detecting a load that interlocks with a store;
    a store data buffer (SDB) providing all or only a portion of data bytes needed by the load;
    a data cache (DC) providing any remaining data bytes needed by the load responsive to only a portion of data bytes needed by the load being provided by the SDB; and
    a load/store queue (LSQ) shifting data bytes output by the SDB and the DC, wherein a first signal output by the LSQ is used to align only the SDB data bytes, and a second signal output by the LSQ is used to align both the SDB and DC data bytes.

2. The method of claim 1 wherein store data provided by the SDB is shifted to adjust data byte lanes.

3. The method of claim 2 further comprising:
    selecting individual data bytes for load data provided by at least one of the SDB and the DC.

4. A processor comprising:
    a load/store unit (LSU) configured to perform store-to-load forwarding (STLF) from an interlocking store by detecting a load that interlocks with a store, wherein a store data buffer (SDB) in the LSU provides all or only a portion of data bytes needed by the load; and
    a data cache (DC) configured to provide any remaining data bytes needed by the load responsive to only a portion of data bytes needed by the load being provided by the SDB;
    wherein the LSU includes a load/store queue (LSQ) configured to shift data bytes output by the SDB and the DC, wherein a first signal output by the LSQ is used to align only the SDB data bytes, and a second signal output by the LSQ is used to align both the SDB and DC data bytes.

5. The processor of claim 4 wherein the LSU selects individual data bytes for load data provided by at least one of the SDB and the DC.

6. A non-transitory computer-readable storage medium configured to store a set of instructions used for fabricating a semiconductor device, wherein the semiconductor device comprises:
    a load/store unit (LSU) configured to perform store-to-load forwarding (STLF) from an interlocking store by detecting a load that interlocks with a store, wherein a store data buffer (SDB) in the LSU provides all or only a portion of data bytes needed by the load; and
    a data cache (DC) configured to provide any remaining data bytes needed by the load responsive to only a portion of data bytes needed by the load being provided by the SDB;
    wherein the LSU includes a load/store queue (LSQ) configured to shift data bytes output by the SDB and the DC, wherein a first signal output by the LSQ is used to align only the SDB data bytes, and a second signal output by the LSQ is used to align both the SDB and DC data bytes.

7. The non-transitory computer-readable storage medium of claim 6 wherein the instructions are Verilog data instructions.

8. The non-transitory computer-readable storage medium of claim 6 wherein the instructions are hardware description language (HDL) instructions.

9. The non-transitory computer-readable storage medium of claim 6 wherein the semiconductor device is a processor.

* * * * *